US007223498B2

(12) United States Patent
Matsubara et al.

(10) Patent No.: US 7,223,498 B2
(45) Date of Patent: May 29, 2007

(54) ELECTRODE FOR A LITHIUM SECONDARY BATTERY AND A LITHIUM SECONDARY BATTERY COMPRISING THE SAME

(75) Inventors: Keiko Matsubara, Yokohama (JP); Toshiaki Tsuno, Yokohama (JP); Akira Takamuka, Yokohama (JP); Sung-Soo Kim, Suwon-si (KR); Bok-Hwan Jung, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 16 days.

(21) Appl. No.: 10/961,470

(22) Filed: Oct. 8, 2004

(65) Prior Publication Data

US 2005/0079423 A1 Apr. 14, 2005

(30) Foreign Application Priority Data

Oct. 9, 2003 (JP) ............................ 2003-350624
May 21, 2004 (KR) ...................... 10-2004-0036297

(51) Int. Cl.
*H01M 4/62* (2006.01)

(52) U.S. Cl. .............. 429/232; 429/231.95; 429/218.1; 252/521.3; 252/511

(58) Field of Classification Search ........... 429/231.95, 429/232, 218.1; 252/571, 521.3
See application file for complete search history.

(56) References Cited

U.S. PATENT DOCUMENTS 6,555,272 B2 * 4/2003 Suzuki et al. ............... 429/217

FOREIGN PATENT DOCUMENTS

| | | | |
|---|---|---|---|
| JP | 4-249862 | | 9/1992 |
| JP | 04-249862 | * | 9/1992 |
| JP | 10-223221 | | 8/1998 |
| JP | 10-294112 | | 11/1998 |
| JP | 11-242954 | | 9/1999 |
| JP | 2000-149937 | | 5/2000 |
| JP | 2000-173594 | | 6/2000 |

OTHER PUBLICATIONS

Patent Abstract of Japan Publication No. 10-223221, published Aug. 21, 1998 in the name of Miyake Naoto, et al.
Patent Abstract of Japan Publication No. 109294112, published Nov. 4, 1998 in the name of Nakajima Motoe, et al.
Patent Abstracts of Japan for Publication No. 11-242954; Date of publication of application Sep. 7, 1999, in the name of Soichiro Kawakami et al.
Patent Abstracts of Japan for Publication No. 04-249862; Date of publication of application Sep. 4, 1992, in the name of Yasuhiro Fujita et al.
Patent Abstracts of Japan for Publication No. 2000-149937; Date of publication of application May 30, 2000, in the name of Yoshiaki Nitta et al.
Patent Abstracts of Japan for Publication No.: 2000-173594; Date of publication of application Jun. 23, 2000, in the name of Takafumi Fujiwara et al.

* cited by examiner

*Primary Examiner*—Laura Weiner
(74) *Attorney, Agent, or Firm*—Christie, Parker & Hale, LLP

(57) ABSTRACT

Disclosed is an electrode for a lithium secondary battery comprising a negative active material powder comprising a metal capable of alloying with lithium, a conductive material powder, and a binder, wherein the density thereof is between 1.2 g/cm$^3$ and 4.0 g/cm$^3$.

6 Claims, 1 Drawing Sheet

ELECTRODE FOR A LITHIUM SECONDARY BATTERY AND A LITHIUM SECONDARY BATTERY COMPRISING THE SAME

CROSS REFERENCE TO RELATED APPLICATION

This application claims priority to and the benefits of Japanese Patent Application No. 2003-350624, filed on Oct. 9, 2003, and Korean Patent Application No. 10-2004-0036297, filed on May 21, 2004, both of which are hereby incorporated by reference in their entireties for all purposes as if fully set forth herein.

FIELD OF THE INVENTION

The present invention relates to an electrode for a lithium secondary battery and a lithium secondary battery comprising the same. In particular, it is directed to an electrode for a lithium secondary battery comprising a negative active material of a metal powder and a lithium secondary battery comprising the same.

BACKGROUND OF THE INVENTION

A metallic material such as Si or Sn capable of alloying with lithium and having a high charge and discharge capacity has been suggested as a substitute for graphite in electrodes for lithium secondary batteries. Recently, it has been reported that by alloying Si with a highly conductive metal, volume expansion of the electrode upon charging the battery is reduced which prevents the electrode from being pulverized and improves the conductivity and the cycle characteristics. It has further been reported that an alloy including Si or Sn can be processed to obtain an amorphous or microcrystalline structure in order to obtain good battery characteristics. (See Japanese Patent Laid-open Publication Nos. H10-294112 and H10-223221).

However, a battery's characteristics may be dramatically deteriorated depending upon the condition of the electrodes even though the battery is fabricated by using a material including Si or Sn.

SUMMARY OF THE INVENTION

It is an aspect of the present invention to provide an electrode for a lithium secondary battery comprising a negative active material of a metal such as Si or Sn, wherein the electrode has good early efficiency or cycle characteristics. It is a further aspect of the invention to provide a lithium secondary battery comprising such an electrode.

In order to achieve the aspect, the present invention provides an electrode for a lithium secondary battery comprising a negative active material powder of a metal capable of alloying with lithium, a conductive powder, and a binder, wherein the electrode has a density of between 1.2 $g/cm^3$ and 4.0 $g/cm^3$.

DETAILED DESCRIPTION

Figure 1:
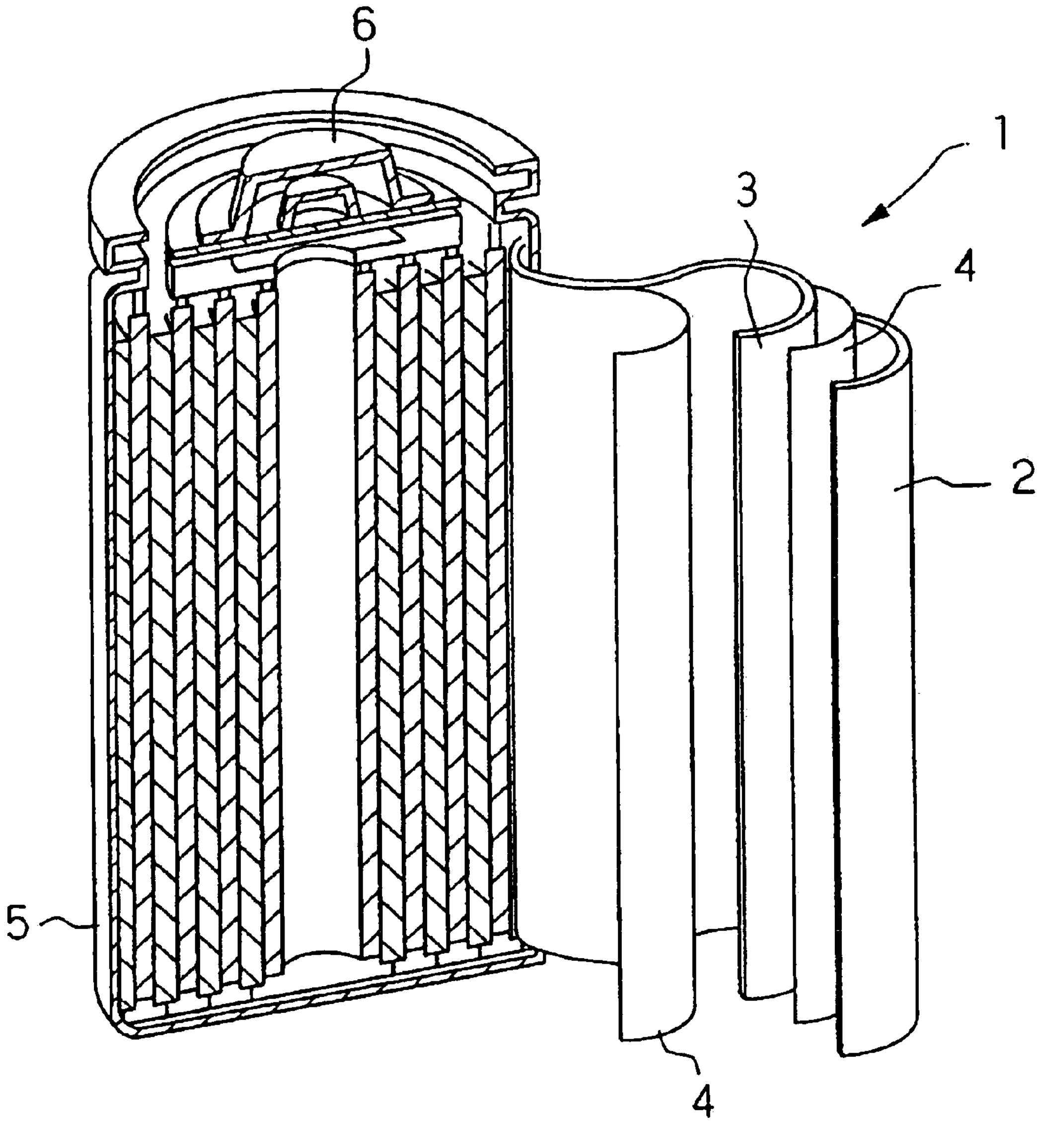
FIG. 1 is a schematic view showing an embodiment of a lithium secondary battery according to the present invention.

In the following detailed description, only certain preferred embodiments of the invention have been shown and described, simply by way of illustration of certain best modes contemplated by the inventors of carrying out the invention. As will be realized, the invention is capable of modification in various obvious respects, all without departing from the invention. Accordingly, the drawings and description are to be regarded as illustrative in nature, and not restrictive.

The electrode for the lithium secondary battery according to the present invention is fabricated to have an electrode density of 1.2 $g/cm^3$ or more, thereby the negative active material powder is firmly aggregated to prevent the negative active material powder from dissociating upon volume expansion when charging the battery, and to prevent cycle deterioration. Further, the negative active material powder and the conductive material powder are firmly hardened so that the conductivity of the electrode and the utilization rate of the negative active material, and particularly the early charge and discharge capacity can be improved.

In addition, the electrode density is controlled to 4.0 $g/cm^3$ or less to improve the impregnation of the electrolyte, to increase the utilization rate of the negative active material, and to improve the early charge and discharge capacity.

The electrode for the lithium secondary battery according to the present invention preferably comprises a conductive material powder having a specific surface area of between 10 $m^2/g$ and 70 $m^2/g$. When the specific surface area of the conductive material powder is more than 10 $m^2/g$, the conductive material powder is capable of suitably maintaining contact between itself and the negative active material powder, and thereby the conductivity of the electrode, the utilization rate of the negative active material, and the early charge and discharge capacity can be improved. In addition, when the specific surface area of the conductive material powder is 70 $m^2/g$ or less, the early charge and discharge capacity is improved as the frequency of intercalating and deintercalating the lithium into the conductive material powder is decreased.

According to the present invention, the electrode for the lithium secondary battery is characterized in that the negative active material powder comprises 20% or less of pulverized particles having a diameter of 5 μm or less.

When the pulverized particles having a diameter of 5 μm are contained in an amount of 20% or less based on the negative active material, the conductive material powder is able to suitably contact the negative active material powder as the number of negative active material particles having a diameter less than that of the conductive material powder is decreased. Thereby, the conductivity of the electrode, the utilization rate of the negative active material, and particularly the early charge and discharge capacity are improved.

Further, the electrode for the lithium secondary battery according to the present invention is characterized in that the metal capable of alloying with the lithium is Si or Sn.

From the above-mentioned composition, the negative active material of the present invention can improve the charge and discharge capacity.

The lithium secondary battery of the present invention comprises the above-mentioned electrode for the lithium secondary battery. One embodiment of such a lithium secondary battery is illustrated in FIG. 1. According to FIG. 1, the rechargeable lithium battery 1 includes an electrode assembly comprising a negative electrode 2; a positive electrode 3; and an optional separator 4 interposed between the negative and positive electrodes. The electrode assembly is placed within a cylindrical battery case 5 with an electrolyte and sealed with a sealing portion 6. However, the configuration of the rechargeable lithium battery is not limited to the structure shown in FIG. 1, as it can be readily modified into other types of batteries including prismatic batteries, pouch type batteries and other types of batteries as are well understood in the related art.

A negative electrode of the above-mentioned electrode for the lithium secondary battery provides a lithium secondary battery with an improved cycle-characteristic and a high early charge and discharge capacity.

The electrode for the lithium secondary battery according to the present invention comprises a negative active material powder including a metal capable of alloying with the lithium, a conductive material powder, and a binder.

The electrode for the lithium secondary battery may be shaped into a sheet, a circle, a disc, a plate, or a column in which a negative active material powder and the conductive material powder are bound by a binder. The most preferable is the sheet shaped electrode integrated with a current collector such as a metal foil or a metal mesh.

The negative active material powder comprises a metal capable of alloying with lithium, or an alloy powder including at least one metal capable of alloying with lithium. In the negative active material powder, the metal is alloyed with lithium upon charging the battery and lithium is released upon discharging the battery.

The metal capable of alloying with lithium may comprise Si or Sn. Si and Sn are easily alloyed with lithium to exhibit a high charge and discharge capacity and to render a negative active material with a high capacity.

It is possible to employ either Si or Sn, or an alloy thereof with another metal.

Further, the conductive material powder is contacted with the negative active material powder to conduct the electrons between the negative active material powders, and thereby the conductivity of the electrode is improved. The conductive material powder preferably comprises a carbonaceous material, and more preferably comprises a powder of a carbonaceous material such as artificial graphite or natural graphite, wherein the particles making up the powder have a mean diameter of from 2 to 5 μm.

In order to improve the cycle characteristic and the early charge and discharge capacity by maintaining the contact between the negative active material powder and the conductive material powder, the electrode for the lithium secondary battery preferable has an electrode density of between 1.2 $g/cm^3$ and 4.0 $g/cm^3$, and more preferably between 1.5 $g/cm^3$ and 4.0 $g/cm^3$.

By making the electrode density 1.2 $g/cm^3$ or more, the negative active material powder can be aggregated with the conductive material powder to improve the conductivity of the electrode and the utilization rate of the negative active material, particularly the early charge and discharge capacity. Further, it can firmly aggregate among negative active materials, preventing the dissociation of the negative active materials due to the volume expansion and inhibiting cycle deterioration. Further, the impregnation of the electrolyte to the electrode is improved by having an electrode density of 4.0 $g/cm^3$ or less, thereby increasing the utilization rate of the negative active material and improving the early charge and discharge capacity.

It is preferable to maintain the specific surface area of the conductive material powder within a range of between 10 $m^2/g$ and 70 $m^2/g$ by contacting the conductive material powder with the negative active material powder to improve the conductivity of the electrode. Examples of materials useful in making a conductive material powder having the above-mentioned ranged specific surface include artificial and natural graphite.

When the specific surface area of the conductive material powder is 10 $m^2/g$ or more, it better contacts the negative active material powder and improves the conductivity of the electrode and the utilization rate of the negative active material, and particularly the early charge and discharge capacity.

In addition, when the specific surface area of the conductive material powder is 70 $m^2/g$ or less, the frequency of intercalating and deintercalating the lithium to the conductive material powder is decreased to improve the early charge and discharge capacity.

When the specific surface area is more than 70 $m^2/g$, the reactivity of the conductive material with the lithium is increased and the lithium is intercalated into the conductive material powder. The conductive material can thereby act as the negative active material. However, a carbonaceous material having the specific surface area of more than 70 $m^2/g$ is generally an amorphous carbon, and exhibits an irreversible feature to the lithium. Thus, it intercalates the lithium but does not deintercalate the already intercalated lithium. Therefore, the early discharge capacity is decreased since the lithium intercalated into the conductive material powder at the first cycle causes an irreversible capacity. Accordingly, it is preferable to control the specific surface area of the conductive material powder to 70 $m^2/g$ or less.

In order to improve the conductivity of the electrode by suitably contacting the conductive material powder with the negative active material powder, it is preferable that 20% or less of the negative active material powder have a diameter of 5 μm or less. It is still more preferable if the mean diameter of the negative active material is between 10 and 40 μm, with the largest diameter on the order of 60 μm.

The pulverized particles having a diameter of 5 μm or less in the negative active material powder are perhaps smaller than the particles in the conductive material powder. It is not desirable for the diameter of the particles of the negative active material to be smaller than the diameter of the particles of the conductive material powder because the powders are poorly contacted so that the desirable effect on the conductivity of the conductive material cannot be achieved. Accordingly, when the ratio of the amount of pulverized particles having a diameter of 5 μm or less in the negative active material is 20% or less, the conductive material powder is suitably contacted with the negative active material powder as the amount of negative active material powder having a diameter less than that of conductive material powder is decreased, and it is possible to improve the conductivity of the electrode and the utilization rate of the negative active material, particularly the early charge and discharge capacity.

Further, the binder can act to solidify the negative active material powder and the conductive material powder to retain the shape of the electrode for the lithium secondary battery. The binder may be either an organic or an inorganic binder, and examples include any binder capable of being dispersed or dissolved in a solvent with the negative active material powder and the conductive material powder, and binding the negative active material powder to the conductive material powder upon removing the solvent. Further, it may be any binder that can be mixed with the negative active material powder and the conductive material powder and solidified such as by pressure solidification to bind the negative active material powder to the conductive material powder.

Examples of the binder include, but are not limited to resins such as vinyl based resins, cellulose based resins, phenol resins, thermosetting resins, and thermoplastic resins, and more particularly, polyvinylidene fluoride, polyvinyl alcohol, carboxymethyl cellulose, and styrene butadiene rubber.

The negative active material powder essentially consists of a Si phase and a SiM phase, and may include at least one of an X phase and a SiX phase in which M is selected from the group consisting of Ni, Co, B, Cr, Cu, Fe, Mg, Mn, Y and combinations thereof and X is selected from the group consisting of Ag, Cu, Au and combinations thereof. However, both M and X are not Cu.

The Si phase is alloyed with the lithium upon charging the battery to provide a $Li_ySi_x$ phase, and releases the lithium and returns to a Si single phase upon discharging the battery.

Further, the SiM phase is not reacted with the lithium upon charging and discharging the battery, and maintains the shape of the negative active material powder to inhibit expansion and contraction of the negative active material powder. Element M of the SiM phase is a metal incapable of alloying with the lithium, and may be selected from the group consisting of Ni, Co, B, Cr, Cu, Fe, Mg, Mn, Y and combinations thereof. One particular example of element M is Ni, and in this case, the composition of the SiM phase would be a $Si_2Ni$ phase.

Further, the X phase can provide the negative active material powder with conductivity and decrease the specific resistance of the negative active material powder. Element X of the X phase is a metal element having a specific resistance of 3 Ωm or less, and includes metals selected from the group consisting of Ag, Cu, Au and combinations thereof. Cu is preferred since it is not alloyed with the lithium and helps inhibit expansion. Element M is selected as a metal incapable of alloying with Ag since it is hard to alloy Ag with Si. Thus, Ag is present as a single phase so that the conductivity of the particle preferably is improved. Further, Cu is an element having features of both element M and element X since it is alloyed with Si and has a resistance less than that of Si. Accordingly, either element M or element X may comprise Cu, but Cu cannot be selected for both element M and element X.

In addition, the SiX phase may be provided together with the X phase or instead of the X phase. The SiX phase can provide the negative active material powder with conductivity like the X phase, and decreases the specific resistance of the negative active material powder.

The Si phase, the SiM phase, the X phase, and the SiX phase may be provided in a crystalline phase, an amorphous phase, or a combination. Furthermore, the negative active material may further comprise an alloy phase other than the Si phase, the SiM phase, the X phase, or the SiX phase.

With respect to the composition of the alloy, as Si is the element composing a Si single phase, the composition ratio and the amount of Si are selected to obtain a Si single phase considering the phase-diagram of the alloy even though the SiM phase or the SiM phase is formed.

However, if the amount of Si is too high, it is undesirable because the negative active material tends to expand and contract upon charging and discharging the battery, pulverizing the negative active material and deteriorating the cycle characteristics. The composition ratio of Si in the negative active material powder is preferable in a range of 30% to 70% by weight.

As element M is an element capable of providing the SiM phase together with the Si, it is preferably added in an amount sufficient to alloy totally with Si, based on the phase-diagram of the alloy. However, if the amount of element M is more than the amount alloying with Si, it is undesirable in that the Si is totally alloyed and the capacity is deteriorated. However, if the amount of element M is insufficient, the SiM phase is deficient to obtain a desirable effect on inhibiting the expansion of the Si phase, thereby deteriorating the cycle characteristics. In addition, the M phase may be present as a plurality with other elements such as in an M1 phase, an M2 phase, and an M3 phase. The composition of element M cannot be concretely defined since the Solid Solution Formation Limit with Si depends upon the specific element. However, the composition ratio should be considered to leave a Si phase even though element M is alloyed with Si at the Solid Solution Limit. Element M does not have the irreversible capacity since it does not alloy with the lithium.

If the amount of X is excessively increased, the specific resistance is decreased and the amount of the Si phase is relatively decreased, thereby deteriorating the charge and discharge capacity. However, if the amount of X is excessively decreased, the specific resistance is increased to deteriorate the charge and discharge efficiency. Accordingly, the amount of X in the negative active material is preferable between 1% and 30% by weight.

Below, a method of fabricating the electrode for the lithium secondary battery will be described in detail.

A negative active material powder, a conductive material powder, and a binder are mixed. To the resulting mixture, a suitable solvent is introduced and mixed to provide an electrode slurry. In this case, the solvent is preferably one capable of dissolving and dispersing a binder. The resulting electrode slurry is coated on a current collector comprising a metal foil, then the solvent is removed such as by heating to solidify the electrode slurry. The solidified electrode slurry is then pressed by a roll press and cut into a suitable size to obtain an electrode for the lithium secondary battery.

When the electrode slurry is pressed, the electrode density is preferably controlled to a range of 1.2 $g/cm^3$ to 4.0 $g/cm^3$.

Hereinafter, a rechargeable lithium battery comprising the negative electrode is described. The rechargeable lithium battery comprises the negative electrode, a positive electrode, and an electrolyte.

The positive electrode comprises, for example, a positive active material capable of intercalating and deintercalating the lithium such as $LiMn_2O_4$, $LiCoO_2$, $LiNiO_2$, $LiFeO_2$, $V_2O_5$, TiS, MoS, organodisulfide compounds, or organopolysulfide compounds. The positive electrode includes a positive active material and may further include a binder such as polyvinylidene fluoride and a conductive agent such as carbon black.

Specific examples for the positive electrode may be exemplified as a sheet-shaped electrode prepared by coating the current collector of a metal foil or a metal mesh.

The electrolyte may include an organic electrolyte with which the lithium is dissolved in an aprotic solvent.

Aprotic solvents include propylene carbonate, ethylene carbonate, butylene carbonate, benzonitrile, acetonitrile, tetrahydrofuran, 2-methyl tetrahydrofuran, γ-butyrolactone, dioxolane, 4-methyl dioxolane, N,N-dimethyl formamide, dimethyl acetamide, dimethyl sulfoxide, dioxane, 1,2-dimethoxy ethane, sulfolane, dichloroethane, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether, or similar solvents or mixtures of such solvents with other solvents. A preferable solvent includes a mixture of one solvent selected from the group consisting of propylene carbonate (PC), ethylene carbonate (EC), and butylene carbonate (BC), and one solvent selected from the group consisting of dimethyl carbonate (DMC), methylethyl carbonate (MEC), and diethyl carbonate (DEC).

The lithium salt may include, but is not limited to, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(CxF_2x+1SO_2)(CyF_2y+1SO_2)$ (where x and y are natural numbers), LiCl, LiI, or mixtures thereof, and preferably is any one of $LiPF_6$, $LiBF_4$, $LiN(CF_3SO_2)_2$, and $LiN(C_2F_5SO_2)$.

The electrolyte may further include a polymer such as PEO, PVA, or a similar polymer with any one of the lithium salts, and a polymer electrolyte comprising a polymer in which the organic electrolyte is impregnated.

Further, in addition to the positive electrode, the negative electrode, and the electrolyte, the rechargeable lithium battery may further comprise, if required, any other material such as a separator interposing the positive electrode and the positive electrode.

According to the present invention, the electrode for the lithium secondary battery can prevent the negative active material from dissociating due to the volume expansion of the negative active material powder upon charging the battery, thereby improving the cycle characteristic. Further, the negative active material powder is suitably contacted with the conductive material powder so that the conductivity of the electrode is improved, increasing the utilization rate of the negative active material, and improving the early charge and discharge capacity.

The rechargeable lithium battery comprising the negative electrode has good cycle life characteristics and high initial charge-discharge capacity.

The following examples further illustrate the present invention in detail but are not to be construed to limit the scope thereof.

EXAMPLE 1

50 parts by weight of silicon powder, 40 parts by weight of Ni powder, and 10 parts by weight of Cu powder were mixed to provide a metal complex powder. The metal complex powder was introduced into a vacuum container mounted with a high frequency heating device. The vacuum container was subjected to a helium atmosphere of $1.5\times10^5$ Pa, and the metal complex powder was heated to 1700° C. with the high frequency heating device to melt the metal. The metal melt was sprayed simultaneously with helium gas under a nozzle pressure of 70 $kg/cm^2$ and quenched to provide a quenched alloy metal powder.

The resulting quenched alloy metal powder was put though a sieve to gather a composition of 2% or less of pulverized particles having a diameter of 5 μm or less. Thereby, it was possible to provide a negative active material powder having a mean particle diameter of 20 μm and comprising 2% or less of pulverized particles of 5 μm or less diameter.

70 parts by weight of the resulting negative active material, 20 parts by weight of a conductive material powder of graphite powder having a BET specific surface area of 17 $m^2/g$, and 10 parts by weight of a binder of polyvinylidene fluoride were mixed, and added to a solvent of N-methylpyrrolidone and agitated to provide a slurry. The resulting slurry was coated on a copper (Cu) foil having a thickness of 14 μm and dried and compressed with a roll press to provide an electrode for a lithium secondary battery having a density of 1.2 $g/cm^3$.

The resulting electrode was cut into a circle shape with a diameter of 13 mm, and was interposed to a porous polypropylene separator. Together with a metal lithium counter electrode, an electrolyte was injected thereto, and a coin-shaped lithium secondary cell was fabricated. For the electrolyte, $LiPF_6$ was added to a mixed solvent of EC:DMC:DEC (3:3:1 in volume ratio) to a concentration of 1.0 mole/L.

EXAMPLE 2

A lithium secondary cell was fabricated by the same procedure as in Example 1, except that the negative electrode had an electrode density of 1.6 $g/cm^3$.

EXAMPLE 3

A lithium secondary cell was fabricated by the same procedure as in Example 1, except that the negative electrode had an electrode density of 2.0 $g/cm^3$.

EXAMPLE 4

A lithium secondary cell was fabricated by the same procedure as in Example 1, except that the negative electrode had an electrode density of 2.4 $g/cm^3$.

EXAMPLE 5

A lithium secondary cell was fabricated by the same procedure as in Example 1, except that the negative electrode had an electrode density of 3.0 $g/cm^3$.

EXAMPLE 6

A lithium secondary cell was fabricated by the same procedure as in Example 1, except that the negative electrode had an electrode density of 3.3 $g/cm^3$.

EXAMPLE 7

A lithium secondary cell was fabricated by the same procedure as in Example 1, except that the conductive material powder was graphite powder having a BET specific surface area of 26 $m^2/g$, and the negative electrode had an electrode density of 2.4 $g/cm^3$.

EXAMPLE 8

A lithium secondary cell was fabricated by the same procedure as in Example 1, except that the conductive material powder was graphite powder having a BET specific surface area of 65 $m^2/g$, and the negative electrode had an electrode density of 2.4 $g/cm^3$.

EXAMPLE 9

A lithium secondary cell was fabricated by the same procedure as in Example 1, except that the conductive material powder was graphite powder having a BET specific surface area of 100 $m^2/g$, and the negative electrode had an electrode density of 2.4 $g/cm^3$.

EXAMPLE 10

A lithium secondary cell was fabricated by the same procedure as in Example 1, except that the negative active material comprised 5% pulverized particles having a diameter of 5 μm or less, the conductive material powder was graphite powder having a BET specific surface area of 17 m²/g, and the negative electrode had an electrode density of 2.4 g/cm³.

EXAMPLE 11

A lithium secondary cell was fabricated by the same procedure as in Example 1, except that the negative active material comprised 10% pulverized particles having a diameter of 5 μm or less, the conductive material powder was graphite powder having a BET specific surface area of 17 m²/g, and the negative electrode had an electrode density of 2.4 g/cm³.

EXAMPLE 12

A lithium secondary cell was fabricated by the same procedure as in Example 1, except that the negative active material comprised 20% pulverized particles having a diameter of 5 μm or less, the conductive material powder was graphite powder having a BET specific surface area of 17 m²/g, and the negative electrode had an electrode density of 2.4 g/cm³.

EXAMPLE 13

A lithium secondary cell was fabricated by the same procedure as in Example 1, except that the negative active material comprised 30% pulverized particles having a diameter of 5 μm or less, the conductive material powder was graphite powder having a BET specific surface area of 17 m²/g, and the negative electrode had an electrode density of 2.4 g/cm³.

For each of the resulting lithium secondary battery cells of Examples 1 to 13, charge and discharge was repeated at the battery voltage of between 0.02 V and 1.5 V and a current density of 0.2 C. The discharge capacity at the first cycle, the charge and discharge efficiency at the first cycle (ratio of discharge capacity to charge capacity), and the ratio of the discharge capacity of the 50$^{th}$ cycle to the first cycle were respectively measured and are shown in the following Table 1.

As shown in Table 1, for the cells of Examples 1 to 6, the conductive material powders and negative active material powders were identical but the electrode densities were different from each other. It is understood that the discharge capacity at the first cycle and the discharge capacity ratio at the 50$^{th}$ cycle to the first cycle were improved depending upon increasing the electrode density.

The reason the discharge capacity at the first cycle is improved is postulated to be that the negative active material powder is firmly aggregated due to the high electrode density and the utilization rate of the negative active material powder is increased. In addition, the reason the discharge capacity at 50$^{th}$ cycle is increased is postulated to be that the volume variation of the electrode is physically inhibited due to the high electrode density and the dissociation of the negative active material is prevented so that the utilization rate thereof is improved.

In addition, the discharge capacity at the first cycle and the discharge capacity ratio at the 50$^{th}$ cycle are slightly decreased as the negative active material powder having a relative large diameter is stressed upon subjecting it to the roll press.

The cells according to Examples 7, 8, and 9 having a high specific surface area have discharge capacity at the first cycle and charge and discharge efficiency at the first cycle less than those of Example 1. This is because the irreversible capacity is increased by the occurrence of the decomposition reaction of the electrolyte on the surface of the conductive material powder.

By using a conductivity material powder having a low specific surface area, the battery characteristic such as the charge and discharge capacity at the first cycle is improved. In this case, as shown in Examples 10 to 13, the pulverized particles are insufficiently contacted with the conductive material powder when the number of pulverized particles having a diameter of 5 μm or less is increased, deteriorating the discharge capacity at the first cycle. Further, the charge and discharge efficiency at the first cycle is decreased since the irreversible capacity of the pulverized particles having diameter of 5 μm or less is high. Thus, the ratio of the discharge capacity of the 50$^{th}$ cycle to the first cycle is improved if the number of pulverized particles having a diameter of 5 μm or less is increased.

TABLE 1

| | Electrode density (g/cm³) | Specific surface area of conductive material powder (m²/g) | Content of pulverized particles of 5 μm or less in negative active material powder (%) | Discharge capacity at first cycle (mAh/g) | Charge and discharge efficiency at first cycle (%) | Ratio of discharge capacity of 50$^{th}$ cycle to first cycle (%) |
|---|---|---|---|---|---|---|
| Example 1 | 1.2 | 17 | 2 | 700 | 91.6 | 70.1 |
| Example 2 | 1.6 | 17 | 2 | 702 | 91.8 | 81.3 |
| Example 3 | 2.0 | 17 | 2 | 705 | 92.0 | 89.8 |
| Example 4 | 2.4 | 17 | 2 | 707 | 92.0 | 91.5 |
| Example 5 | 3.0 | 17 | 2 | 704 | 91.6 | 91.3 |
| Example 6 | 3.3 | 17 | 2 | 697 | 91.1 | 88.0 |
| Example 7 | 2.4 | 26 | 2 | 690 | 90.2 | 90.5 |
| Example 8 | 2.4 | 65 | 2 | 673 | 87.3 | 88.6 |
| Example 9 | 2.4 | 100 | 2 | 640 | 83.5 | 85.2 |
| Example 10 | 2.4 | 17 | 5 | 702 | 91.6 | 91.0 |
| Example 11 | 2.4 | 17 | 10 | 690 | 89.8 | 97.3 |
| Example 12 | 2.4 | 17 | 20 | 679 | 87.1 | 83.4 |
| Example 13 | 2.4 | 17 | 30 | 666 | 85.2 | 78.1 |

According to the above, the lithium secondary battery comprising the electrode for the lithium secondary battery according to one embodiment of the present invention has a battery density of between 1.2 g/cm$^3$ and 4.0 g/cm$^3$, a specific surface area of between 10 m$^2$/g and 70 m$^2$/g, and comprises 20% or less of pulverized particles with a diameter of 5 μm or less in the negative active material. Such a battery shows good battery characteristics.

As described above, the electrode for the lithium secondary battery of the present invention can prevent the negative active material powder from dissociating due to the volume expansion of the negative active material powder upon charging the battery to improve the cycle characteristic. Further, the negative active material powder is suitably contacted with the conductive material powder to improve the conductivity of the electrode, to increase the utilization rate of the negative active material powder, and particularly to improve the early charge and discharge capacity.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrode for a lithium secondary battery, comprising:

a negative active material powder comprising a metal capable of alloying with the lithium;

a conductive material powder having a specific surface area of between 10 m$^2$/g and 70 m$^2$/g; and a binder, wherein an electrode density thereof ranges from about 1.5 g/cm$^3$ to about 4.0g/cm$^3$.

2. The electrode for a lithium secondary battery according to claim 1, wherein the negative active material powder comprises 20% or less of pulverized particles having a particle diameter of 5 μm or less.

3. The electrode for a lithium secondary battery according to claim 1, wherein the metal capable of alloying with lithium is Si or Sn.

4. An electrode for a lithium secondary battery comprising:

a negative active material powder comprising a metal capable of alloying with the lithium, wherein the metal capable of alloying with lithium is Si or Sn;

a conductive material powder having a specific surface area of between 10 m$^2$/g and 70 m$^2$/g; and a binder, wherein an electrode density thereof ranges from about 1.2 g/cm$^3$ to about 4.0g/cm$^3$.

5. An electrode for a lithium secondary battery comprising:

a negative active material powder comprising a metal capable of alloying with the lithium, wherein the negative active material powder comprises a Si phase and a SiM phase, wherein M is selected from the group consisting of Ni, Co, B, Cr, Cu, Fe, Mg, Mn, Y and mixtures thereof, a conductive material powder having a specific surface area of between 10 m$^2$/g and 70 m$^2$/g; and a binder, wherein an electrode density thereof ranges from about 1.2 g/cm$^3$ to about 4.0g/cm$^3$.

6. The electrode for a lithium secondary battery according to claim 5, wherein the negative active material powder further comprises a X phase and a SiX phase, wherein X is at least one selected from the group consisting of Ag, Cu, Au and mixtures thereof and both M and X are not Cu.

* * * * *

UNITED STATES PATENT AND TRADEMARK OFFICE

CERTIFICATE OF CORRECTION

PATENT NO. : 7,223,498 B2
APPLICATION NO. : 10/961470
DATED : May 29, 2007
INVENTOR(S) : Matsubara et al.

It is certified that error appears in the above-identified patent and that said Letters Patent is hereby corrected as shown below:

<u>In the Claims</u>

Column 12, lines 1-3, Claim 3

Delete "The electrode for a lithium secondary battery according to claim 1, wherein the metal capable of alloying with lithium is Si or Sn", Insert --A lithium secondary battery comprising the electrode for a lithium secondary battery according to claim 1.--

Signed and Sealed this

Twentieth Day of May, 2008

JON W. DUDAS

*Director of the United States Patent and Trademark Office*